(12) United States Patent
Lee et al.

(10) Patent No.: US 10,085,058 B2
(45) Date of Patent: Sep. 25, 2018

(54) DEVICE AND METHOD FOR TRANSMITTING AND RECEIVING DATA USING HDMI

(71) Applicant: LG ELECTRONICS INC., Seoul (KR)

(72) Inventors: Hyeonjae Lee, Seoul (KR); Jangwoong Park, Seoul (KR); Hyunsik Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/518,954

(22) PCT Filed: Oct. 13, 2015

(86) PCT No.: PCT/KR2015/010790
§ 371 (c)(1),
(2) Date: Apr. 13, 2017

(87) PCT Pub. No.: WO2016/060447
PCT Pub. Date: Apr. 21, 2016

(65) Prior Publication Data
US 2017/0245003 A1 Aug. 24, 2017

Related U.S. Application Data

(60) Provisional application No. 62/063,918, filed on Oct. 14, 2014.

(51) Int. Cl.
*H04N 21/41* (2011.01)
*H04N 21/426* (2011.01)
*H04N 21/436* (2011.01)
*H04N 21/4363* (2011.01)
*H04N 21/472* (2011.01)
*H04N 21/439* (2011.01)

(52) U.S. Cl.
CPC ... *H04N 21/43635* (2013.01); *H04N 21/4394* (2013.01); *H04N 21/472* (2013.01)

(58) Field of Classification Search
CPC .......... H04N 21/4108; H04N 21/4122; H04N 21/42684; H04N 21/43615
USPC ............................................. 725/74, 80, 85
See application file for complete search history.

(56) References Cited

U.S. PATENT DOCUMENTS

2007/0186015 A1* 8/2007 Taft ..................... G09G 5/006
710/16

FOREIGN PATENT DOCUMENTS

| JP | 2006-203725 A | 8/2006 |
| KR | 10-2009-0051445 A | 5/2009 |
| KR | 10-2010-0050373 A | 5/2010 |

(Continued)

*Primary Examiner* — Dominic D Saltarelli
(74) *Attorney, Agent, or Firm* — Birch, Stewart, Kolasch & Birch, LLP

(57) ABSTRACT

A method for a source device transmitting data by using HDMI (High Definition Media Interface) to transmit and receive data is disclosed. A method for an HDMI source device to transmit and receive data comprises transmitting, to a sink device, a request for reading out EDID (Extended Display Identification Data) if the sink device is connected; receiving, from the sink device, EDID including port information of the sink device; transmitting operation parameter information determined based on the EDID; and transmitting data through HDMI.

20 Claims, 11 Drawing Sheets

| Byte / Bits # | 7 | 6 | 5 | 4 | 3 | 2 | 1 | 0 |
|---|---|---|---|---|---|---|---|---|
| 0 | Port Description Tag Code | | | The total number of bytes for port descriptor | | | | |
| 1 | Total Port Numbers | | | | Current Port Number | | | |
| 2 (Port1) | Feature7 | Feature6 | Feature5 | Feature4 | Feature3 | Feature2 | Feature1 | Feature0 |
| 3 (Port1) | Feature7 | Feature6 | Feature5 | Feature4 | Feature3 | Feature2 | Feature1 | Feature0 |
| 4 (Port1) | Feature7 | Feature6 | Feature5 | Feature4 | Feature3 | Feature2 | Feature1 | Feature0 |
| 5 (Port1) | Feature7 | Feature6 | Feature5 | Feature4 | Feature3 | Feature2 | Feature1 | Feature0 |

(56) References Cited

FOREIGN PATENT DOCUMENTS

KR          10-1092458  B1    12/2011
KR     10-2012-0111478  A     10/2012

\* cited by examiner

[Fig. 1]
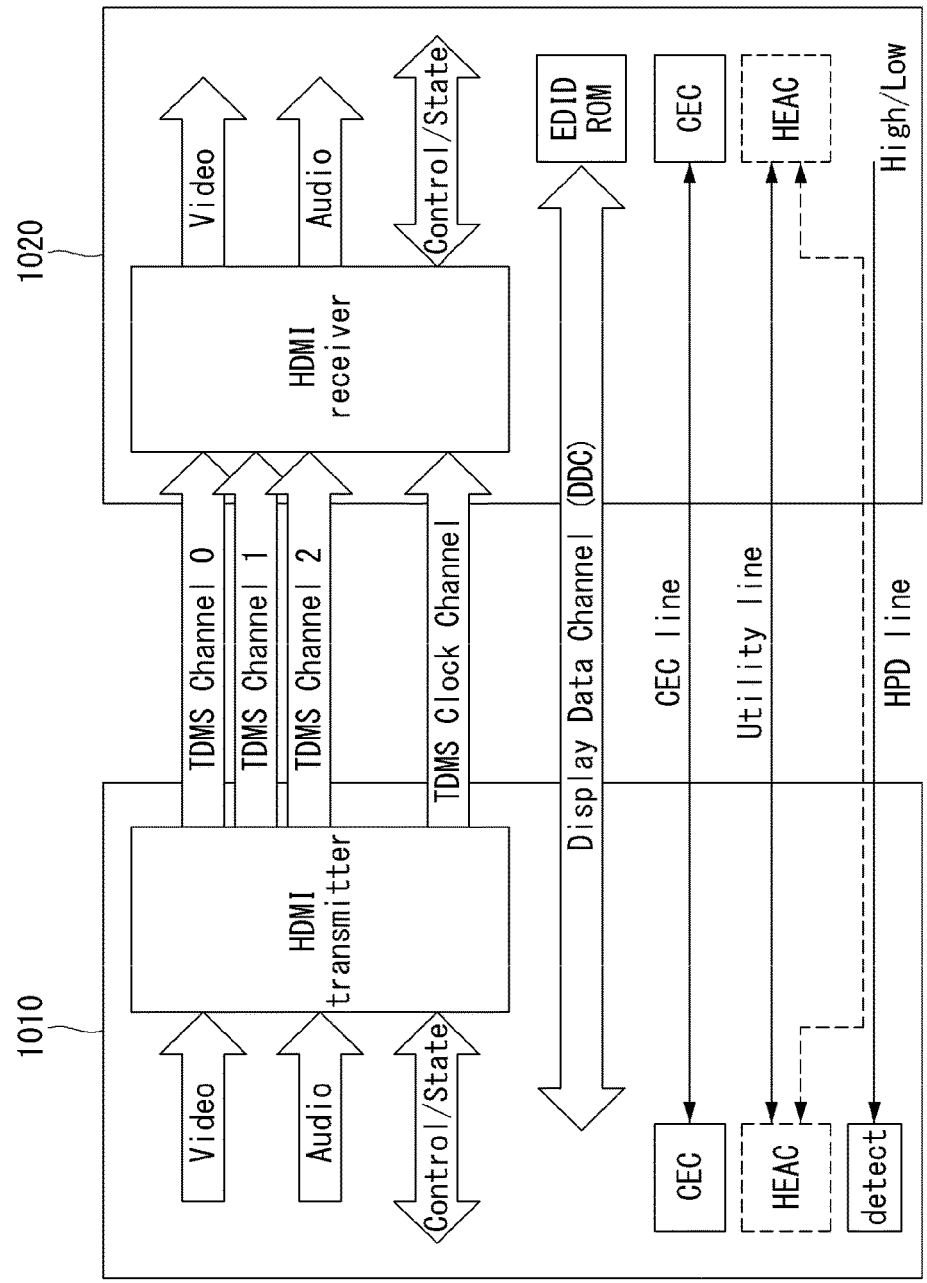

[Fig. 2]
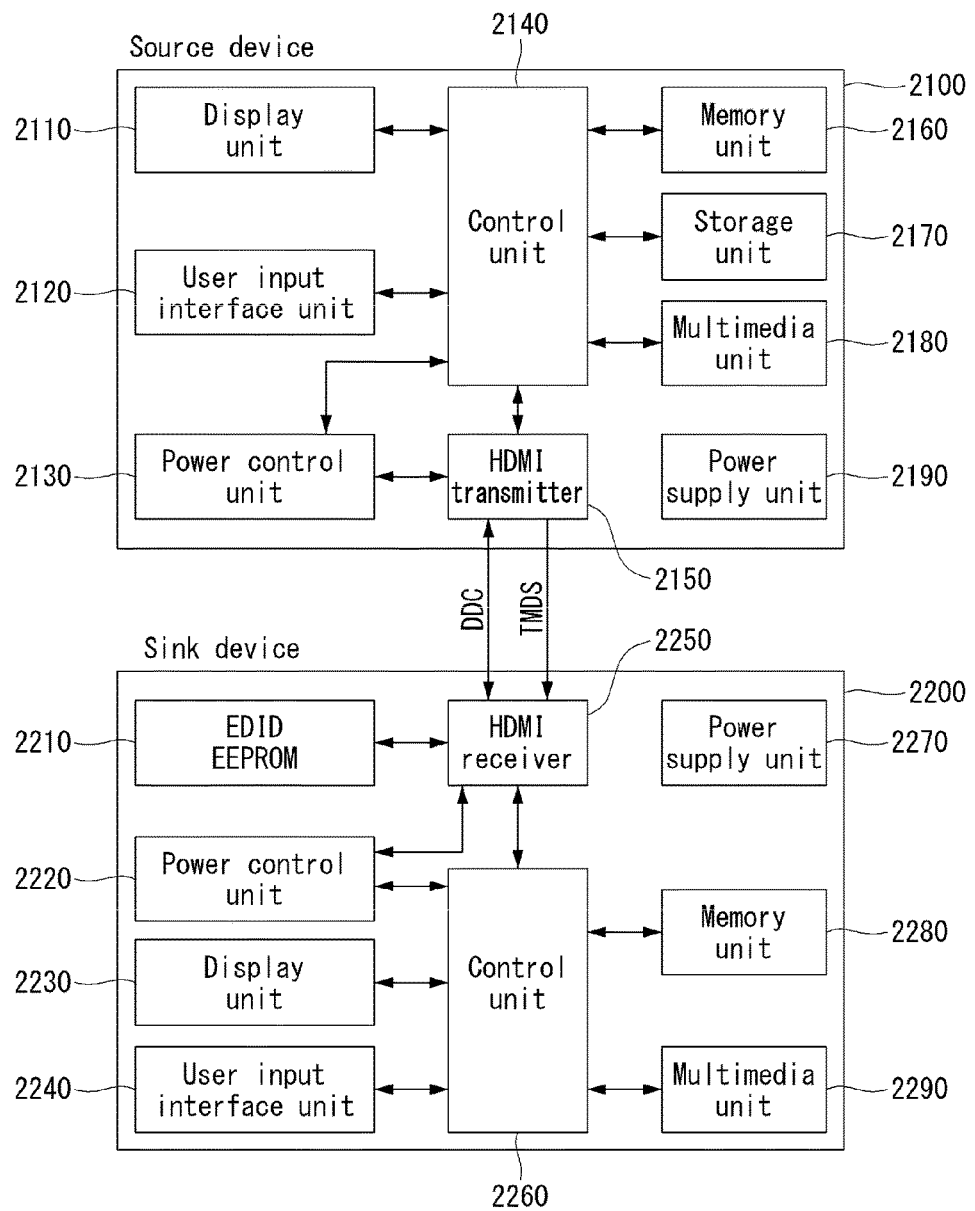

[Fig. 3]

| Address | No. Bytes | Description |
|---|---|---|
| 00h ~ 07h | 8 | Header information. Fixed to 00 FF FF FF FF FF FF 00. |
| 08h ~ 11h | 10 | Vendor/Product identification. Manufacturer, Product code, Serial number, and Date of Manufacture |
| 12h ~ 13h | 2 | EDID structure version/revision |
| 14h ~ 18h | 5 | Basic Display Parameters/Features. Video input definition (analog or digital),Max. Horizontal Image Size, Max. Vertical Image Size, Display Transfer Characteristic(Gamma), Feature Support(Standby, Suspend, Display Type, Standard Default Color space (sRGB), Preferred Timing Mode support and so on) |
| 19h ~ 22h | 10 | Color Characteristics. Information related to color and white point. Express in terms of xy-coordinaes of red, green, blue, and white in the color space. |
| 23h ~ 25h | 3 | Established Timings. Describes commonly used timing mode |
| 26h ~ 35h | 16 | Standard Timings. Describes 8 standard timing descriptors, and one descriptor includes information about range of horizontal active pixel, image aspect ratio, and refresh rate (60 ~ 123 Hz). Timing not belonging to the established timing is described accoridng to the VESA DMT standard or usesthe timing informaiton calculated by using GTF. |
| 36h ~ 7Dh | 72 | Detailed Timing Descriptors. Describes detailed timing information about display resolution, and four descriptors are used. The first descriptor describes preferred detailed timing, the second descriptor describes secondary detailed timing or monitor additional information (serial number, range limites, and name). The remaining two descriptors include monitor additional information. Monitor range limit and name must be described. |
| 7Eh | 1 | Extension Flag. Specifies the number of additional EDID extensin blocks. |
| 7Fh | 1 | Checksum. |

[Fig. 4]

| Byte # | |
|---|---|
| 0 | Tag. 0x02 |
| 1 | Revision Number. 0x03 |
| 2 | Byte number offset d value at which Detailed Timing Descriptor (DTD) of 18 bytes starts |
| 3 | Indication of underscan, audio support, YCBCR 4:4:4 or YCBCR 4:2:2 support, the number of native DTDs supported. |
| 4 | Start of data block collection |
| d-1 | End of data block collection |
| d | Start of 18-byte DTD. Follows the EDID DTD format |
| d+(18*n)-1 | End of 18-byte DTD. n is the number of descriptors included |
| d+(18*n) | Beginning of Padding. 0x00 |
| 126 | End of Padding. 0x00 |
| 127 | Checksum. |

[Fig. 5]

(a) Video Data Block

| Byte # | Bits 5-7 | Bits 0-4 |
|---|---|---|
| 0 | Video Tag Code | The total number of bytes for Short Video Descriptor (L1) |
| 1 | CEA Short Video Descriptor 1 | |
| L1 | CEA Short Video Descriptor L1 | |

(b) Audio Data Block

| Byte # | Bits 5-7 | Bits 0-4 |
|---|---|---|
| 0 | Audio Tag Code | The total number of bytes for Short Audio Descriptor (L2) |
| 1~3 | CEA Short Audio Descriptor 1 | |
| 4~3*L2 | CEA Short Video Descriptor L2/3 | |

(c) Speaker Allocation Data Block

| Byte # | Bits 5-7 | Bits 0-4 |
|---|---|---|
| 0 | Speaker allocation Tag Code | The total number of bytes for Speaker Allocation (L3 = 3) |
| 1~3 | Speaker Allocation Data Block Payload | |

[Fig. 6]

| Byte / Bits # | 7 | 6 | 5 | 4 | 3 | 2 | 1 | 0 |
|---|---|---|---|---|---|---|---|---|
| 0 | Vendor Specific Tag Code (=3) | | | Length(=N) | | | | |
| 1 | IEEE OUI, Third Octet (0xD8) | | | | | | | |
| 2 | IEEE OUI, Second Octet (0x5D) | | | | | | | |
| 3 | IEEE OUI, First Octet (0xC4) | | | | | | | |
| 4 | Version (=1) | | | | | | | |
| 5 | Max_TMDS_Character_Rate | | | | | | | |
| 6 | SCDC_Present | RR_Capable | Rsvd (0) | Rsvd (0) | LTE_340Mcsc_scramble | Indpendent_view | Dual_View | 3D_OSD_Disparity |
| 7 | Rsvd (0) | Rsvd (0) | Rsvd (0) | Rsvd (0) | Rsvd (0) | DC_48bit_420 | DC_36bit_420 | DC_30bit_420 |
| ...N | Reserved (0) | | | | | | | |

[Fig. 7]
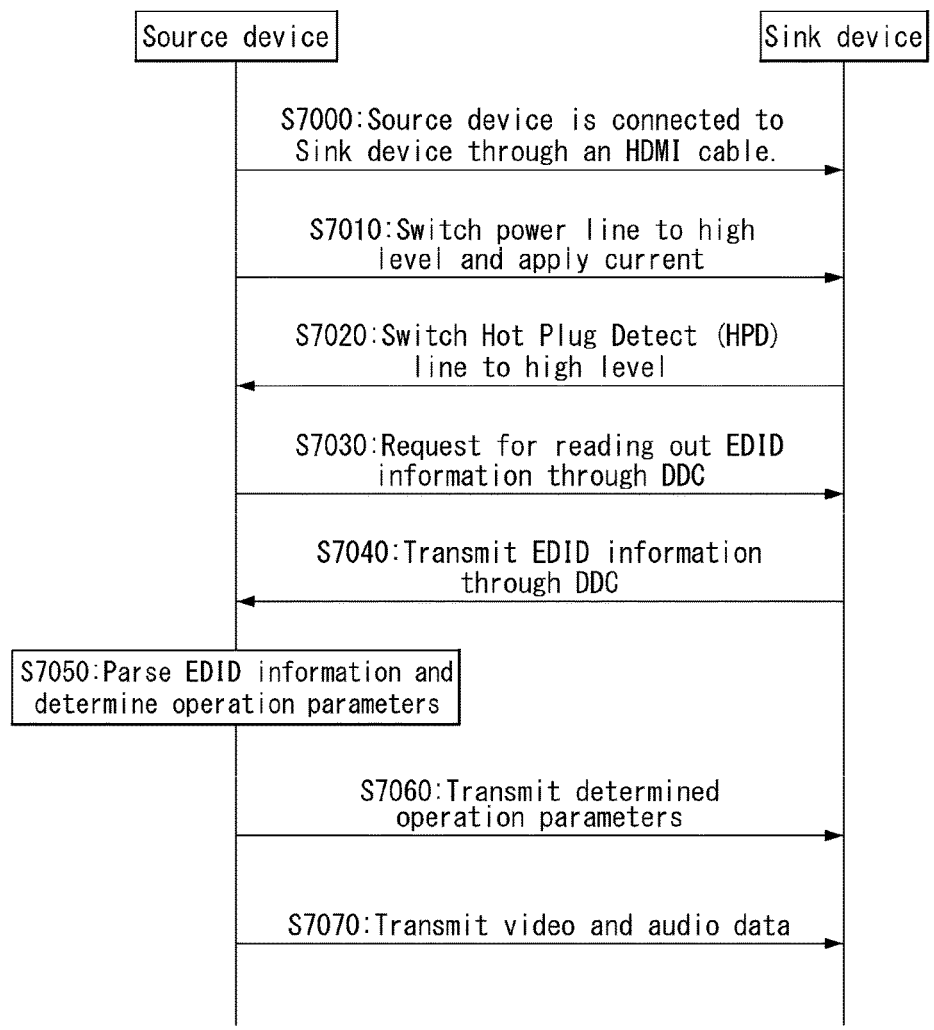

[Fig. 8]
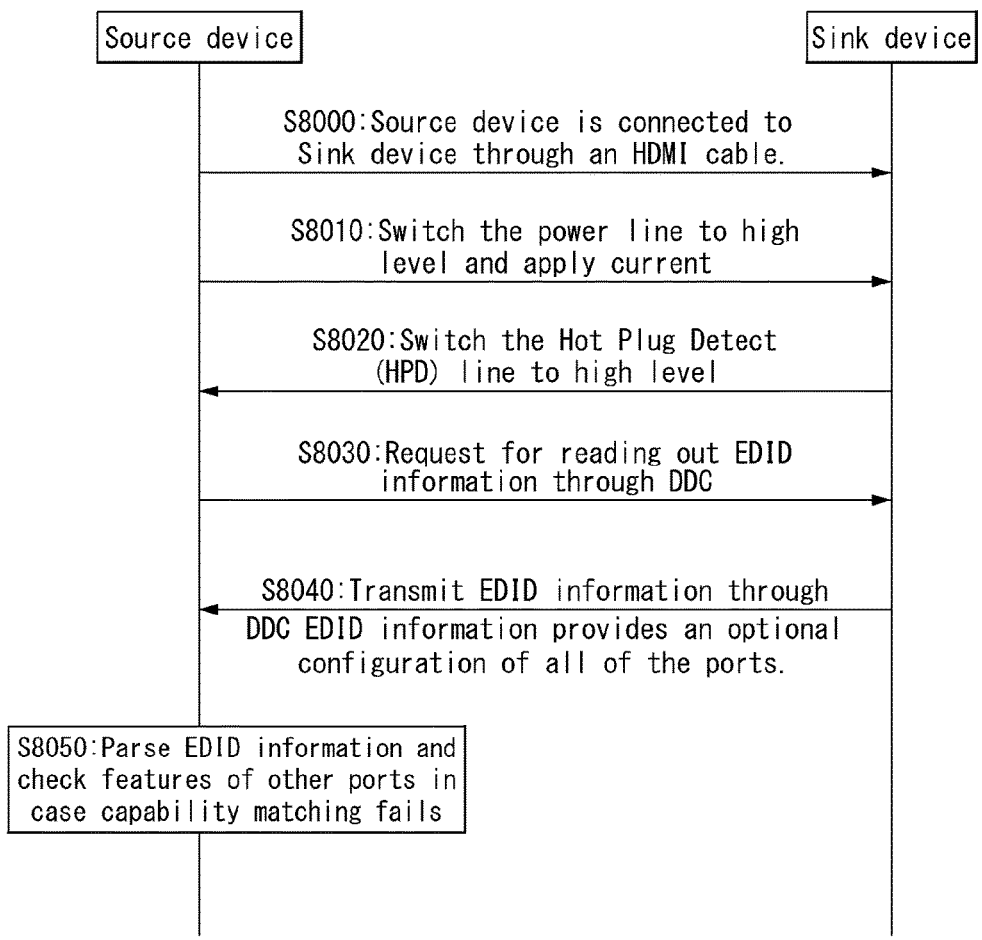

[Fig. 9]

| Byte / Bits # | 7 | 6 | 5 | 4 | 3 | 2 | 1 | 0 |
|---|---|---|---|---|---|---|---|---|
| 0 | Port Description Tag Code | | | The total number of bytes for port descriptor | | | | |
| 1 | Total Port Numbers | | | | Current Port Number | | | |
| 2 (Port1) | Feature7 | Feature6 | Feature5 | Feature4 | Feature3 | Feature2 | Feature1 | Feature0 |
| 3 (Port1) | Feature7 | Feature6 | Feature5 | Feature4 | Feature3 | Feature2 | Feature1 | Feature0 |
| 4 (Port1) | Feature7 | Feature6 | Feature5 | Feature4 | Feature3 | Feature2 | Feature1 | Feature0 |
| 5 (Port1) | Feature7 | Feature6 | Feature5 | Feature4 | Feature3 | Feature2 | Feature1 | Feature0 |

[Fig. 10]

| Byte / Bits # | 7 | 6 | 5 | 4 | 3 | 2 | 1 | 0 |
|---|---|---|---|---|---|---|---|---|
| 0 | Vendor Specific Tag Code (=3) | | | | Length (=N) | | | |
| 1 | IEEE OUI, Third Octet (0xD8) | | | | | | | |
| 2 | IEEE OUI, Second Octet (0x5D) | | | | | | | |
| 3 | IEEE OUI, First Octet (0xC4) | | | | | | | |
| 4 | Version (=2) | | | | | | | |
| 5 | Max_TMDS_Character_Rate | | | | | | | |
| 6 | SCDC_Present | RR_Capable | Rsvd(0) | Rsvd(0) | LTE_340Mcsc_scramble | Indpendent_view | Dual_View | 3D_OSD_Disparity |
| 7 | Rsvd(0) | Rsvd(0) | Rsvd(0) | Rsvd(0) | Rsvd(0) | DC_48bit_420 | DC_36bit_420 | DC_30bit_420 |
| 8 | Total Port Numbers | | | | Current Port Number | | | |
| 9(Port1) | Feature7 | Feature6 | Feature5 | Feature4 | Feature3 | Feature2 | Feature1 | Feature0 |
| 10(Port1) | Feature7 | Feature6 | Feature5 | Feature4 | Feature3 | Feature2 | Feature1 | Feature0 |
| 11(Port1) | Feature7 | Feature6 | Feature5 | Feature4 | Feature3 | Feature2 | Feature1 | Feature0 |
| 12(Port1) | Feature7 | Feature6 | Feature5 | Feature4 | Feature3 | Feature2 | Feature1 | Feature0 |

[Fig. 11]
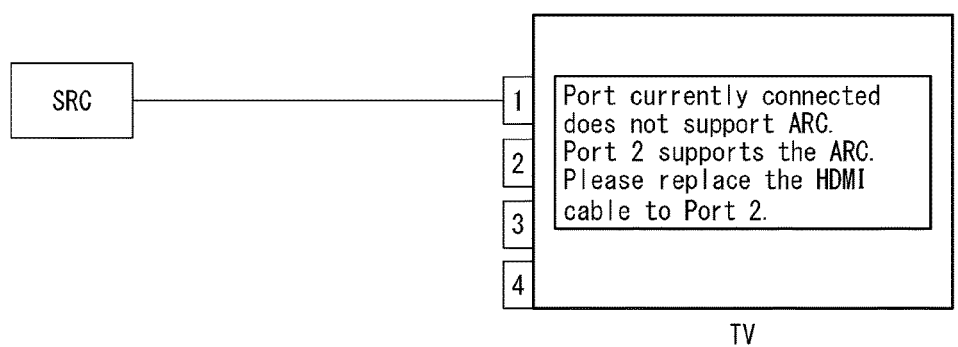
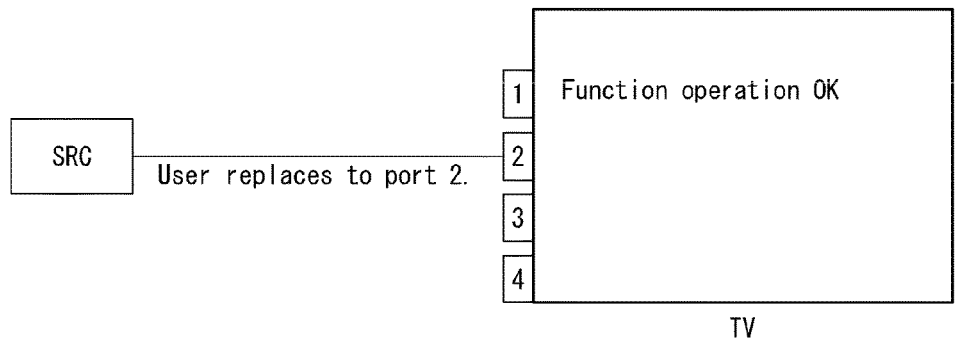

DEVICE AND METHOD FOR TRANSMITTING AND RECEIVING DATA USING HDMI

CROSS REFERENCE TO RELATED APPLICATIONS

This application is the National Phase of PCT International Application No. PCT/KR2015/010790, filed on Oct. 13, 2015, which claims priority under 35 U.S.C. 119(e) to U.S. Provisional Application No. 62/063,918, filed on Oct. 14, 2014, all of which are hereby expressly incorporated by reference into the present application.

TECHNICAL FIELD

The present invention is related to a device and a method for transmitting and receiving data using HDMI (High Definition Multimedia Interface) and more specifically, a method for using a port that matches a support function of a sink device by receiving port information of a source device through HDMI.

BACKGROUND ART

HDMI is an interface/standard that develops a Digital Visual Interface (DVI) which is an interface standard of personal computers and displays for a use of AV electronic products. Since the HDMI transmits video/audio from a player to a display device without compressing it, there is very little latency between a source device and a sink device. And the HDMI has high format compatibility since the HDMI does not require separate decoder chip or software. In addition, the HDMI is available to make wirings between AV devices be simplified, which were complicated because video signals, audio signals and control signals are transmitted on only one cable, and the HDMI provides a High-bandwidth Digital Content Protection (HDCP) technique, thereby providing the copyright protection function.

INVENTION CONTENT

Technical Problem

Due to the advance of HDMI technology and standards, HDMI ports with varying capability are now available. Recent HDMI sink devices provide a plurality of HDMI ports, capability of which may be the same to or different from each other. In the HDMI standard version 2.0, many features are optional, and therefore supported capability of ports may differ from each other. Therefore, port descriptions of an HDMI sink device are transmitted and received by being embedded in the EDID so that a source device may perform data transmission taking into account the corresponding HDMI port.

A source device may obtain descriptions of the corresponding port used for actual connection by reading out the EDID of a sink device. However, in this case, the source device is aware of the features of only the corresponding port currently connected to an HDMI cable but is not informed of the features of other ports. Therefore, if an HDMI cable is connected to a port not supported by the source device, data transmission and reception may not be performed smoothly or the source device may transmit and receive only low quality data while other ports may be utilized.

Technical Solution

To solve the technical problem above, a method for a source device transmitting video/audio data by using HDMI (High Definition Media Interface) to transmit and receive data according to an embodiment of the present invention comprises transmitting, to a sink device, a request for reading out EDID (Extended Display Identification Data) if the sink device is connected; receiving, from the sink device, EDID including port information of the sink device; transmitting operation parameter information determined based on the EDID; and transmitting the video/audio data.

Also, in a method for a source device to transmit data according to an embodiment of the present invention, the port information may include feature information of a port to which an HDMI cable is currently connected and feature information for at least one other port to which no HDMI cable is connected at the moment.

Also, in a method for a source device to transmit data according to an embodiment of the present invention, the port information may be received by being included in an HF-VSDB (HDMI Forum-Vendor Specific Data Block) or CEC extension block.

Also, in a method for a source device to transmit data according to an embodiment of the present invention, the port information may include at least one of the total number of physical ports of the sink device, port number of a port currently connected to the sink device, and at least one feature indicator for ports belonging to the sink device.

Also, in a method for a source device to transmit data according to an embodiment of the present invention, when the currently connected port does not support a specific function of the source device, a user interface providing other port information that supports the specific function may be provided.

To solve the technical problem above, a source device transmitting compressed video/audio data by using HDMI according to an embodiment of the present invention comprises an HDMI transmitter transmitting and receiving data through HDMI; and a controller controlling data communication through the HDMI transmitter, wherein the source device is configured to transmit, to a sink device, a request for reading out EDID (Extended Display Identification Data) if the sink device is connected; to receive, from the sink device, EDID including port information of the sink device; to transmit operation parameter information determined based on the EDID; and to transmit the video/audio data.

Also, in a source device according to an embodiment of the present invention, the port information may include feature information of a port to which an HDMI cable is currently connected and feature information for at least one other port to which no HDMI cable is connected at the moment.

Also, in a source device according to an embodiment of the present invention, the port information may be received by being included in an HF-VSDB (HDMI Forum-Vendor Specific Data Block) or CEC extension block.

Also, in a source device according to an embodiment of the present invention, the port information may include at least one of the total number of physical ports of the sink device, port number of a port currently connected to the sink device, and at least one feature indicator for ports belonging to the sink device.

Also, in a source device according to an embodiment of the present invention, in case the currently connected port does not support a specific function of the source device, a user interface providing other port information that supports the specific function may be provided.

To solve the technical problem above, a method for a sink device receiving video/audio data by using HDMI (High Definition Media Interface) to transmit and receive data according to an embodiment of the present invention comprises receiving, from a connected source device, a request for reading out EDID (Extended Display Identification Data); transmitting, to the source device, EDID including port information of the sink device; receiving, from the source device, operation parameter information; and receiving the video/audio data.

Also, in a method for a sink device to transmit data according to an embodiment of the present invention, the port information may include feature information of a port to which an HDMI cable is currently connected and feature information for at least one other port to which no HDMI cable is connected at the moment.

Also, in a method for a sink device to transmit data according to an embodiment of the present invention, the port information may be transmitted by being included in an HF-VSDB (HDMI Forum-Vendor Specific Data Block) or CEC extension block.

Also, in a method for a sink device to transmit data according to an embodiment of the present invention, the port information may include at least one of the total number of physical ports of the sink device, port number of a port currently connected to the sink device, and at least one feature indicator for ports belonging to the sink device.

Also, in a method for a sink device to transmit data according to an embodiment of the present invention, when the currently connected port does not support a specific function of the source device, a user interface providing other port information that supports the specific function may be provided.

To solve the technical problem above, a sink device receiving video/audio data by using HDMI (High Definition Media Interface) according to an embodiment of the present invention comprises an HDMI receiver transmitting and receiving data through HDMI; and a controller controlling data communication through the HDMI receiver, wherein the sink device is configured to receive, from a connected source device, a request for reading out EDID (Extended Display Identification Data); to transmit, to the source device, EDID including port information of the sink device; to receive, from the source device, operation parameter information; and to receive the video/audio data.

Also, in a sink device according to an embodiment of the present invention, the port information may include feature information of a port to which an HDMI cable is currently connected and feature information for at least one other port to which no HDMI cable is connected at the moment.

Also, in a sink device according to an embodiment of the present invention, the port information may be transmitted by being included in an HF-VSDB (HDMI Forum-Vendor Specific Data Block) or CEC extension block.

Also, in a sink device according to an embodiment of the present invention, the port information may include at least one of the total number of physical ports of the sink device, port number of a port currently connected to the sink device, and at least one feature indicator for ports belonging to the sink device.

Also, in a sink device according to an embodiment of the present invention, in case the currently connected port does not support a specific function of the source device, a user interface providing other port information that supports the specific function may be provided.

Advantageous Effect

The present invention may solve the problem caused when capability of an HDMI port of a source device does not match the capability of an HDMI port required for a sink device. In particular, a source device may figure out not only the port to which an HDMI cable is currently connected but also the configuration of other ports. Therefore, in case the capability of a currently connected port does not meet the capability, the present invention may solve the problem due to lack of the corresponding capability and guide to connect to other port capable of providing the corresponding capability. A source device may ensure an optimal video/audio data transmission environment by using an HDMI port providing relevant capability. A sink device may be equipped with various types of HDMI ports and utilize the capability of all of the installed HDMI ports.

BRIEF DESCRIPTION OF THE DRAWINGS

FIG. 1 illustrates an HDMI system and data transmission and reception channels included in the HDMI system according to one embodiment of the present invention.

FIG. 2 illustrates a source device and a sink device in a HDMI system according to an embodiment of the present invention.

FIG. 3 illustrates an EDID structure according to an embodiment of the present invention.

FIGS. 4 to 5 illustrate an embodiment of an EDID extension block.

FIG. 6 illustrates an HF (HDMI Forum)-VSDB (Vendor-Specific Data Block) according to an embodiment of the present invention.

FIG. 7 illustrates a method for transmitting and receiving A/V data through HDMI according to an embodiment of the present invention.

FIG. 8 illustrates a method for transmitting and receiving A/V data through HDMI according to another one embodiment of the present invention.

FIG. 9 illustrates a CEA extension block signaling port information according to one embodiment of the present invention.

FIG. 10 illustrates HF (HDMI Forum)-VSDB (Vendor-Specific Data Block) signaling port information according to one embodiment of the present invention.

FIG. 11 illustrates a method for a source device to provide a UI according to one embodiment of the present invention.

MODE FOR INVENTION

In what follows, preferred embodiments of the present invention will be described in detail with reference to appended drawings. Detailed descriptions given below with reference to appended drawings are not limited only to those embodiments that can be realized according to the embodiments of the present invention, but they are intended to describe preferred embodiments of the present invention. The following descriptions include specific details to provide thorough understanding of the present invention. However, it should be clearly understood by those skilled in the art that the present invention can be implemented without employing the specific details.

Most terms used in this document are used widely in the corresponding technical field, but part of the terms have been chosen arbitrarily by the applicant, of which the meaning will be described in detail in the following description depending on the needs. Therefore, the present invention should be understood by the intended meaning of used terms rather than their apparent names or immediate implication.

FIG. 1 illustrates an HDMI system and data transmission and reception channels included in the HDMI system according to one embodiment of the present invention.

Devices that transmit and receive video/audio/control data using HDMI can be called collectively an HDMI system, and the HDMI system can comprise a source device 1010, a sink device 1020, and an HDMI cable. In the HDMI system, a device that transmits video/audio data through HDMI corresponds to the source device 1010, a device that receives video/audio data through HDMI corresponds to the sink device 1020, and an HDMI cable supporting data transmission and reception connects the two devices. Since an HDMI cable provides HDMI, an HDMI cable may be shortly called HDMI in what follows.

As shown in FIG. 1, the HDMI cables and the connectors may perform pairing of four channels that provides a Transition Minimized Differential Signaling (TMDS) data channel and a TMDS clock channel. The TMDS data channels may be used for forwarding video data, audio data and auxiliary data.

Additionally, the HDMI system provides a VESA (Video Electronics Standards Association) DDC (Display Data Channel). The DDC is used for configuration of one source device and one sink device and exchange of status information between them. A CEC protocol can provide a high-level control function among various audio-visual products in a user environment and may be used optionally. Also, an optional HEAC (HDMI Ethernet and Audio Return Channel) may provide Ethernet-compatible data networking among an ARC (Audio Return Channel) and connected devices in the opposite direction from a TMDS.

Video data, audio data and supplementary data may be transmitted and received through three TDMS data channels. Commonly, a TMDS clock runs a video pixel rate, and is transmitted through a TMDS clock channel. The TMDS clock may be used as a reference frequency for data recovery in three TMDS data channels in an HDMI receiver. In a source device, the data of 8 bits per TMDS data channel may be transformed into a sequence of 10 bits of which transition is minimized, which is DC balanced, and transmitted in serial manner with a rate of 10 bits per TMDS clock period.

In order to transmit audio data and supplementary data through the TMDS channel, the HDMI uses a packet structure. In order to attain high reliability for audio data and control data, data may be transmitted in word of 10 bits which is generated by using a BCH error correction code and an error reduction coding.

The source device can figure out configuration information and available functions of the sink device by reading out E-EDID (Enhanced Extended Display Identification Data) of the sink device in the DDC (Display Data Channel). In what follows, the E-EDID may be called EDID information.

A utility line can be used for an optional extension function such as HEAC.

FIG. 2 illustrates a source device and a sink device in a HDMI system according to an embodiment of the present invention.

In the HDMI system, the device that transmits video/audio data through HDMI corresponds to the source device 2100, and the device that receives video/audio data through HDMI corresponds to the sink device 2200.

The source device 2100 can include at least one of a display unit 2110, user input interface unit 2120, video encoding unit(video encoder) 2130, control unit 2140, HDMI transmitter 2150, memory unit 2160, storage unit 2170, multimedia unit 2180, or power supply unit 2190. The sink device 2200 can include at least one of an EDID EEPROM 2210, video decoding unit 2220, display unit 2230, user input interface unit 2240, HDMI receiver 2250, control unit 2260, power supply unit 2270, memory unit 2280, or multimedia unit 2290. In what follows, descriptions about units performing the same operation will not be repeated.

The source device 2100 represents a physical device transmitting or streaming contents stored in the storage unit to the sink device 2200. The source device 2100 can send a request message to the sink device; or receive and process a request message from the sink device. Also, the source device 2100 can provide an UI through which a response message that the sink device 2200 transmits with respect to a transmitted request message is processed and delivered to the user, and in case the source device 2100 includes the display unit 2110, the UI can be displayed.

The sink device 2200 can receive contents from the source device 2100, transmit a request message to the source device 2100, or transmit a response message by processing a message received from the source device 2100. The sink device 2200 can also provide an UI through which a response message received from the source device 2100 is processed and delivered to the user, and in case the sink device 2200 includes the display unit 2230, the UI can be displayed.

The source device 2100 and the sink device 2200 can include a user input interface unit 2120, 2240 that receives the user's action or input, and as an example, the user input interface 2120, 2240 can correspond to a remote controller, voice reception/recognition device, or touch input sensing/receiving device.

The memory unit 2160, 2280 represents a volatile physical device in which various types of data are stored temporarily.

The storage unit 2170 represents a nonvolatile physical device in which various types of data can be stored.

The EDID EEPROM 2210 represents an EEPROM that stores EDID information.

The aforementioned memory unit, storage unit, and EDID EEPROM all perform the function of storing data, which may be called collectively a memory unit.

The display unit 2110, 2230 displays data received through HDMI, data stored in a content storage, or UI on a screen according to the control of the control unit.

The multimedia unit 2180, 2290 plays various types of multimedia contents. The multimedia unit 2180, 2290 may be implemented independently of the control unit 2140, 2260 or implemented as one physical component together with the control unit.

The power supply unit 2190, 2270 supplies power required for operating a source device, sink device, and sub-units belonging to the source and sink devices.

The HDMI transmitter 2150 is the unit that is installed in the source device 2100 and transmits and receives data through HDMI. The HDMI transmitter 2150 transmits and receives data including a command between devices and a request, action, or response message as well as audio/video data.

The video encoding unit 2130 compresses video data to be transmitted through the HDMI transmitter 2150. The video encoding unit 2130 may be omitted depending on the embodiments of the present invention.

The HDMI receiver 2250 is the unit that is installed in the sink device 2200 and transmits and receives data through HDMI. The HDMI receiver 2250 transmits and receives data including a command between device.

The video decoding unit 2220 decompresses compressed video data received through the HDMI receiver 2250. The video decoding unit 2220 may be omitted depending on the embodiments of the present invention.

In the embodiment of FIG. 2, a sink device may provide four HDMI ports. In the embodiment, each port may support the following operation/capability.

Port 1: support for HDCP2.2(High-bandwidth Digital Content Protection)
Port 2: support for ARC (Audio Return Channel)
Port 3: support for 4K60P 4:4:4 format
Port 4: support for MHL (Mobile High-definition Link)

In case a sink device provides a plurality of HDMI ports, information of each port may be stored in the EDID. However, the ports may not be used simultaneously but connected one at a time. Therefore, when port information is stored individually, it is not possible to know the information of the corresponding port unless connected directly thereto.

In what follows, channels, data structure, and functions provided by the HDMI will be described in more detail.

As described above, the HDMI system provides a DDC (Display Data Channel), which is a protocol standard defined by the VESA (Video Electronics Standard Association) specifying transmission of digital information between the monitor and the computer graphic adaptor. HDMI devices can transmit information for display modes supported by the monitor to the graphic adaptor through the DDC, and the graphic adaptor can transmit images to the monitor according to the information. Before the DDC standard is approved, the VGA standard defined four pins (Pin 11, 12, 4, and 15) of an analog VGA connector for the purpose of recognizing monitor types; among the four pins, only the pin 11, 12, and 4 have been actually used, and 7 types of monitor types could be recognized. The following provide DDC specifications for the respective versions.

DDC version 1 (approved in 1994)
  EDID (Extended Display Identification Data) is defined, which is a binary file format specifying monitoring information.
  Pin 12 is used as a data line, and an EDID block of 128 byte is transmitted consecutively from a monitor to a computer.
DDC version 2 (approved in 1996)
  EDID is no longer defined by the DDC, but specified separately as a companion standard.
  DDC version 2 is based on I2C serial bus. Pin 12 is now used as the data line, and pin 15 is used as the clock line of I2C bus.
Pin 9 is used to supply 5V DC power (up to 50 mA) from the computer to the monitor to read the EDID stored in the EEPROM even if the monitor is powered off.
  DDC version 2 uses an 8 bit data offset and supports the EDID storage capacity ranging from 28 bytes to 256 bytes.
  E-DDC
  E-DDC replaces the DDC version 1 and 2, and version 1 was introduced in 1999. To use E-EDID (Enhanced EDID), the E-DDC allows up to 32 Kbytes of display information storage capacity.
  By employing a new I2C addressing scheme based on 8-bit segment index (0x00~0x7F), 128 segments (1 segment=256 bytes) can be accessed, by which up to 32 bytes can be accessed.
  E-DDC version 1.1 was approved in 2004, which supports a video interface such as HDMI in addition to CE devices and VGA.
  E-DDC version 1.2 was approved in 2007, which supports display port and display ID In what follows, EDID provided through the DDC will be described.

FIG. 3 illustrates an EDID structure according to an embodiment of the present invention.

EDID is a data structure containing various types of information for the display device defined in the VESA and can be transmitted to the source device through the DDC channel or read by the source device. In the case of EDID, the data structure of version 1.3 has been used in the IT display device, CE display device, and video interface (HDMI).

FIG. 3 shows an overview of the information represented by the respective addresses in the EDID data structure.

FIGS. 4 to 5 illustrate an embodiment of an EDID extension block.

FIG. 4 illustrates an EDID extension block, FIG. 5(*a*) a video data block, FIG. 5(*b*) an audio data block, and FIG. 5(*c*) a speaker allocation data block.

Timing information specified in the EDID is intended for IT display devices and can use the EDID 1.3 extension block defined in the CEA-861 to represent the timing information of CE display devices. The version 3 CEA extension block is defined in the CEA-861B standard and specifies four optional data blocks (video, audio, speaker allocation, and vendor-specific data block).

In the video data block of FIG. 5(*a*), the short video indicator represents the video identification code defined in the CEA-861. In the audio data block of FIG. 5(*b*), the short audio indicator represents the audio format code defined in the CEA-861. In the speaker allocation data block of FIG. 5(*c*), the speaker allocation data block indicator represents the data block payload defined in the CEA-861.

FIG. 6 illustrates an HF (HDMI Forum)-VSDB (Vendor-Specific Data Block) according to an embodiment of the present invention.

The HF-VSDB shown in FIG. 6 is the data block that defines vendor-specific data, where HDMI can define HDMI-specific data by using the data block. The HF-VSDB can be included in the E-EDID of the sink device, and in that case, it can be positioned at CEA extension version 3 within the E-EDID of the sink device.

The fields included in the HF-VSDB of FIG. 6 are described as follows.

Length field: represents the total length of the data block, of which the minimum value is 7, and the maximum value is 31.
IEEE OUI field: refers to IEEE Organizationally Unique Identifier, and the OUI assigned to the HDMI forum is 0xC45DD8.
Version field: represents the version number of the HF-VSDB (HDMI Forum-VSDB), of which the value is 1.
Max_TMDS_Character_Rate field: represents the maximum TMDS character rate supported. If the sink device does not support the maximum TMDS character rate more than 340 Mcsc, it is set to 0; otherwise, it is set to 1.
3D_OSD_Disparity: when this field is set to 1, it indicates that the sink device supports reception of 3D_OSD_Disparity Indication.
Dual_view: when this field is set to 1, it indicates that the sink device supports reception of dual_view signaling.

Independent_view field: when this field is set to 1, it indicates that the sink device supports reception of 3D independent view signaling.

LTE_340Mcsc_scramble field: when this field is set to 1, it indicates that the sink device supports scrambling when the TMDS character rate is less than 340 Mcsc. And when the SCDC_Present is set to 0, this field also has to be set to 0.

RR_Capable field: when this field is set to 1, it indicates that the sink device can initiate an SCDC read request. And if the SCDC_Present is set to 0, this field also has to be set to 0.

SCDC_Present field: when this field is set to 1, it indicates that the sink device supports the SCDC function.

DC 48 bit_420, DC_36 bit_420, DC_30 bit_420: when these fields are set to 1, it indicates that deep color 4:2:0 pixel encoding is supported by 10 bit/12 bit/16 bit per component.

The present invention is capable of signaling decompression capability information of the sink device through an HF-VSDB of the EDID, which will be described later.

FIG. 7 illustrates a method for transmitting and receiving A/V data through HDMI according to an embodiment of the present invention.

FIG. 9 shows an embodiment in which HDMI devices transmit A/V data (at least one of audio data or video data) from a source device to a sink device.

First, the source device and the sink device are connected to each other through an HDMI cable S7000. If the HDMI cable is connected, the source device changes the 5V power line from the low level to the high level and applies currents S7010. By doing so, the source device can operate the EEPROM and related circuit in which the EDID information of the sink device is stored. By changing the HPD (Hot Plug Detect) line from the low level to the high level S7020, the sink device can inform the source device that the cable has been connected normally, the EDID-related circuit has been activated, and thus the EDID information can be accessed.

Now, the source device can transmit the EDID information read request to the sink device through the DDC S7030. In response to the EDID read request of the source device, the sink device can transmit the EDID information stored in the EEPROM through the DDC S7040. In the embodiment of the present invention, the EDID information can be transmitted as the aforementioned CEC extension block or VSDB.

The sink device can determine operation parameters (timing, format, and so on) for the A/V data to be transmitted to the sink device by parsing the received EDID information S7050 and transmit to the source device determined operation parameters related to the A/V data to be transmitted S7060. In the embodiment of the present invention, the operation parameters may be transmitted as the HF-VSIF.

Finally, the source device can transmit A/V data controlled by the determined operation parameters to the sink device S7070.

As shown in FIG. 2, an HDMI sink device may be equipped with a plurality of HDMI ports with varying capability. For example, as shown in FIG. 2, port 1 may support HDCP2.2 (High-bandwidth Digital Content Protection), port 2 may support ARC (Audio Return Channel), port 3 may support 4K60P 4:4:4 format, and port 4 may support MHL (Mobile High-definition Link). In this case, suppose a source device utilizes the ARC function. If HDMI is connected to the port 1, the source device may determine that a sink device does not support the ARC function even though the sink device has a port supporting the ARC function. Accordingly, the source device may turn off the ARC function or treat it as an error.

FIG. 8 illustrates a method for transmitting and receiving A/V data through HDMI according to another one embodiment of the present invention.

Since the steps of S8000-S8030 of FIG. 8 are the same as the steps of S7000-S7030 of FIG. 7, descriptions will not be repeated for the steps of S8000 to S8030. Similarly, although part of the steps of FIG. 7 (S7060 and S7070) are not illustrated again in FIG. 8, the same operation thereof may be applied to the description of FIG. 8.

In the embodiment of FIG. 8, a sink device is capable of transmitting EDID information S8040. The EDID information includes port information of the sink device. The port information may include not only the information for currently connected ports but also the information for other ports. The port information may include feature information of all of the ports installed in the sink device.

The source device may parse received EDID information S8050. The source device may determine whether the feature or capability of a port to which HDMI is currently connected matches the transmission mode of A/V data to be transmitted now by using the port information included in the EDID information. Moreover, if capability of the port does not support the transmission mode of A/V data, the source device may additionally check the features of other ports.

In case at least one of the other ports supports the feature that matches the transmission mode of A/V data to be transmitted now, the source device may switch connection to the corresponding port. In the event there is no other port supporting the matching feature, the source device may perform data transmission excluding the corresponding feature.

The sink device may first parse the port information of a port to which an HDMI cable is currently connected from the port information of received EDID information and determine whether a supported function matches the feature of the corresponding port. And in case the feature of a currently connected port does not matches the supported function, the sink device may additionally check the features of other ports. Therefore, in case other ports support the feature that matches a function of the source device, the sink device provides the user with information related to the corresponding port number as an UI to guide the HDMI cable to be connected to the corresponding port.

Therefore, this document describes a method for providing port information comprising not only the corresponding port information but also all of the port information for ports installed for a sink device through EDID according to the present invention.

In addition, a sink device may determine operation parameters (for example, timing and format) of A/V data to be transmitted to a sink device by parsing received EDID information and transmit to a source device the determined operation parameters related to the A/V data to be transmitted. In an embodiment of the present invention, the operation parameters may be transmitted in the form of HF-VSIF. Lastly, the source device may transmit A/V data controlled by the determined operation parameters to the sink device.

FIG. 9 illustrates a CEA extension block signaling port information according to one embodiment of the present invention.

FIG. 9 illustrates a CEA extension block configured to represent the features of all the ports of a sink device according to an embodiment of the present invention.

As shown in FIG. 9, the additional CEA extension block represents port information that may include the following fields/information.

Port description tag code field: assign existing untagged code.

Port indicator total number of byte field: represents the number of bytes allocated to the data area of the block.

Total port number field: represents the number of physical ports installed in a sink device. In the embodiment of FIG. 9, it is four but may support up to 15 ports by allocating additional bytes.

Current port number field: represents the port number of a sink device currently connected through an HDMI cable.

Port field 1-4: represent the physical port number of a sink device. The order/format of the number may be different according to how the ports are implemented.

Feature field 1-7: bit field describing a feature that each port optionally supports, which may indicate that the port supports the feature in the case of 1 but indicates that the port does not support the feature in the case of 0. One byte is allocated for each port to form a feature set, and depending on the number of representing features, the number of data or bits may be varied. As an embodiment, the 8 bits may represent the following features, respectively. A feature field may be called a feature indicator. Each feature indicator may represent a function that a source device supports.

Feature0: 4K60P 4:2:0 format
Feature1: ARC
Feature2: Wide view (21:9) format
Feature3: HDCP2.2
Feature4: 4K60P 4:4:4 format
Feature5: Multi-stream audio
Feature6: Dynamic Audio LipSync
Feature7: CEC2.0

FIG. 10 illustrates HF (HDMI Forum)-VSDB (Vendor-Specific Data Block) signaling port information according to one embodiment of the present invention.

FIG. 10 illustrates an embodiment in which port information of a sink device is augmented in addition to the HF-VSDB shown in FIG. 6. As described above, the HF-VSDB of FIG. 10 is one type of EDID information, which may include fields representing feature information for all of physical ports belonging to the sink node as well as the ports to which an HDMI cable is currently connected.

FIG. 10 additionally defines a new HF-VSDB and may set the version field to 2 to distinguish the new HF-VSDB from that of the previous version. To describe the information for all of the ports of the sink device, byte 8 block to byte 12 block of the HF-VSDB may be used. The embodiment of FIG. 10 describes a case in which the number of physical ports is four; depending on the embodiments, information for a more number of ports may be provided by allocating additional byte blocks.

The descriptions about additional byte blocks of FIG. 10 are the same as given in detail in FIG. 9.

FIG. 11 illustrates a method for a source device to provide a UI according to one embodiment of the present invention.

As described above, a source device (SRC) may determine whether the feature of a port to which HDMI is currently connected matches a function to be provided by using the port information included in the EDID received from a sink device (TV). And the source device may provide the corresponding function if the feature of the port matches the function to be provided.

If the feature information of a currently connected port does not match the function to be provided, the source device may check feature information of other ports not connected. And if a port supporting the feature that matches the function to be provided is found, the source device may guide an HDMI connection to the corresponding port. FIG. 11 illustrates a case in which the function to be provided by the source device is the ARC function.

As shown in FIG. 11, the source device may provide a message saying "The port you are connecting to does not support ARC. Port 2 supports the ARC. Please replace the HDMI cable to Port 2" through the sink device. Such a message may be provided by voice. FIG. 11 shows the message in the form of a GUI (Graphical User Interface), but various other forms of UI may be provided to the user.

If the HDMI cable is connected to a different port, the source device may display such a message as "function operation OK" to indicate that the HDMI cable has been connected to the port having the feature that matches the supported function or provide a message indicating that the corresponding function is supported in the form of a UI.

Although the embodiment assumes that the source device provides the aforementioned UI, the source device may transmit the UI or message to the sink device so that the sink device may provide the UI or message. In other words, as described above, in case the feature of a currently connected port does not support a specific function that the source device provides (namely the port feature does not match the function that the source device provides), the source device or sink device may provide a user interface providing port information of another port supporting the specific function.

It will be understood by those skilled in the art to which the present invention belongs that the present invention can be modified or changed in various ways without departing from the technical principles or scope of the present invention. Therefore, it is intended that the present invention includes modifications and changes of the present invention provided within the technical scope defined by appended claims and their equivalents.

In this document, the device and the method according to the present invention have been described fully, and descriptions for the device and method can be applied to each other in a complementary manner.

[Mode for Invention]

Various embodiments are described in Best mode for invention

INDUSTRIAL APPLICABILITY

The present invention is used in a series of HDMI fields.

It is apparent to an ordinary skilled person in the art that various modifications and changes may be made without departing from the spirit and scope of the present invention. Accordingly, the present invention is intended to include the modifications and changes of the present invention within the attached claims and the equivalent scope.

The invention claimed is:

1. A method for a source device transmitting and receiving audio/video data by using a High Definition Media Interface (HDMI), the method comprising:

transmitting, to a sink device, a request for reading out Extended Display Identification Data (EDID) if the sink device is connected;

receiving, from the sink device, the EDID including port information regarding a plurality of ports of the sink device, wherein the port information includes a port number of a port connected to the source device among the plurality of ports and feature information for each of the plurality of ports;

determining whether the port supports a specific function of the source device and operation parameter information for the audio/video data, by parsing the received EDID;

if the port supports the specific function of the source device, transmitting, to the sink device, the determined operation parameter information; and transmitting, to the sink device, the audio/video data controlled by the determined operation parameter information.

2. The method of claim 1, wherein the feature information includes feature information of a port to which an HDMI cable is currently connected and feature information for at least one other port to which no HDMI cable is connected at the moment.

3. The method of claim 1, wherein the port information is received by being included in an HDMI Forum-Vendor Specific Data Block (HF-VSDB) or Consumer Electronics Control (CEC) extension block.

4. The method of claim 1, wherein the port information further includes at least one of the total number of physical ports of the sink device and at least one feature indicator for the plurality of ports.

5. The method of claim 1, further comprising, if the port does not support the specific function of the source device, providing a user interface indicating other port information that supports the specific function.

6. A source device transmitting and receiving audio/video data by using a High Definition Media Interface (HDMI), the source device comprising:

a HDMI transmitter transmitting and receiving data through the HDMI; and a controller controlling data communication through the HDMI transmitter, wherein the source device is configured to:

transmit, to a sink device, a request for reading out Extended Display Identification Data (EDID) if the sink device is connected, receive, from the sink device, the EDID including port information regarding a plurality of ports of the sink device, wherein the port information includes a port number of a port connected to the source device among the plurality of ports and feature information for each of the plurality of ports, determine whether the port supports a specific function of the source device and the determined operation parameter information for the audio/video data, by parsing the received EDID, if the port supports the specific function of the source device, transmit, to the sink device, the operation parameter information determined based on the EDID, and transmit, to the sink device, the audio/video data controlled by the determined operation parameter information.

7. The source device of claim 6, wherein the feature information includes feature information of a port to which an HDMI cable is currently connected and feature information for at least one other port to which no HDMI cable is connected at the moment.

8. The source device of claim 6, wherein the port information is received by being included in an HDMI Forum-Vendor Specific Data Block (HF-VSDB) or Consumer Electronics Control (CEC) extension block.

9. The source device of claim 6, wherein the port information further includes at least one of the total number of physical ports of the sink device and at least one feature indicator for the plurality of ports.

10. The source device of claim 6, wherein, if the port does not support the specific function of the source device, the controller is configured to provide a user interface indicating other port information that supports the specific function.

11. A method for a sink device transmitting and receiving audio/video data by using a High Definition Media Interface (HDMI), the method comprising:

receiving, from a source device connected with the sink device, a request for reading out Extended Display Identification Data (EDID);

transmitting, to the source device, the EDID including port information regarding a plurality of ports of the sink device, wherein the port information includes a port number of a port connected to the source device among the plurality of ports and feature information for each of the plurality of ports;

if the port supports a specific function of the source device, receiving, from the source device, operation parameter information determined by parsing the EDID; and receiving, from the source device, the audio/video data controlled by the operation parameter information.

12. The method of claim 11, wherein the feature information includes feature information of a port to which an HDMI cable is currently connected and feature information for at least one other port to which no HDMI cable is connected at the moment.

13. The method of claim 11, wherein the port information is transmitted by being included in a HDMI Forum-Vendor Specific Data Block (HF-VSDB) or Consumer Electronics Control (CEC) extension block.

14. The method of claim 11, wherein the port information further includes at least one of the total number of physical ports of the sink device and at least one feature indicator for the plurality of ports.

15. The method of claim 11, wherein, if the port does not support the specific function of the source device, a user interface indicating other port information that supports the specific function is provided by the source device.

16. A sink device transmitting and receiving audio/video data by using a High Definition Media Interface (HDMI), the sink device comprising:

a HDMI receiver transmitting and receiving data through the HDMI; and a controller controlling data communication through the HDMI receiver, wherein the sink device is configured to:

receive, from a source device connected with the sink device, a request for reading out Extended Display Identification Data (EDID), transmit, to the source device, the EDID including port information regarding a plurality of ports of the sink device, wherein the port information includes a port number of a port connected to the source device among the plurality of ports and feature information for each of the plurality of ports, if the port supports a specific function of the source device, receive from the source device, operation parameter information determined by parsing the EDID, and receive, from the source device, the audio/video data controlled by the operation parameter information.

17. The sink device of claim 16, wherein the feature information includes feature information of a port to which an HDMI cable is currently connected and feature information for at least one other port to which no HDMI cable is connected at the moment.

18. The sink device of claim 16, wherein the port information is transmitted by being included in an HDMI Forum-Vendor Specific Data Block (HF-VSDB) or Consumer Electronics Control (CEC) extension block.

19. The sink device of claim 16, wherein the port information further includes at least one of the total number of physical ports of the sink device and at least one feature indicator for the plurality of ports.

20. The sink device of claim 16, wherein, if the port does not support the specific function of the source device, a user interface indicating other port information that supports the specific function is provided by the source device.

\* \* \* \* \*